June 23, 1936. R. O. COUCH 2,045,442
AERATING DEVICE
Filed March 19, 1935
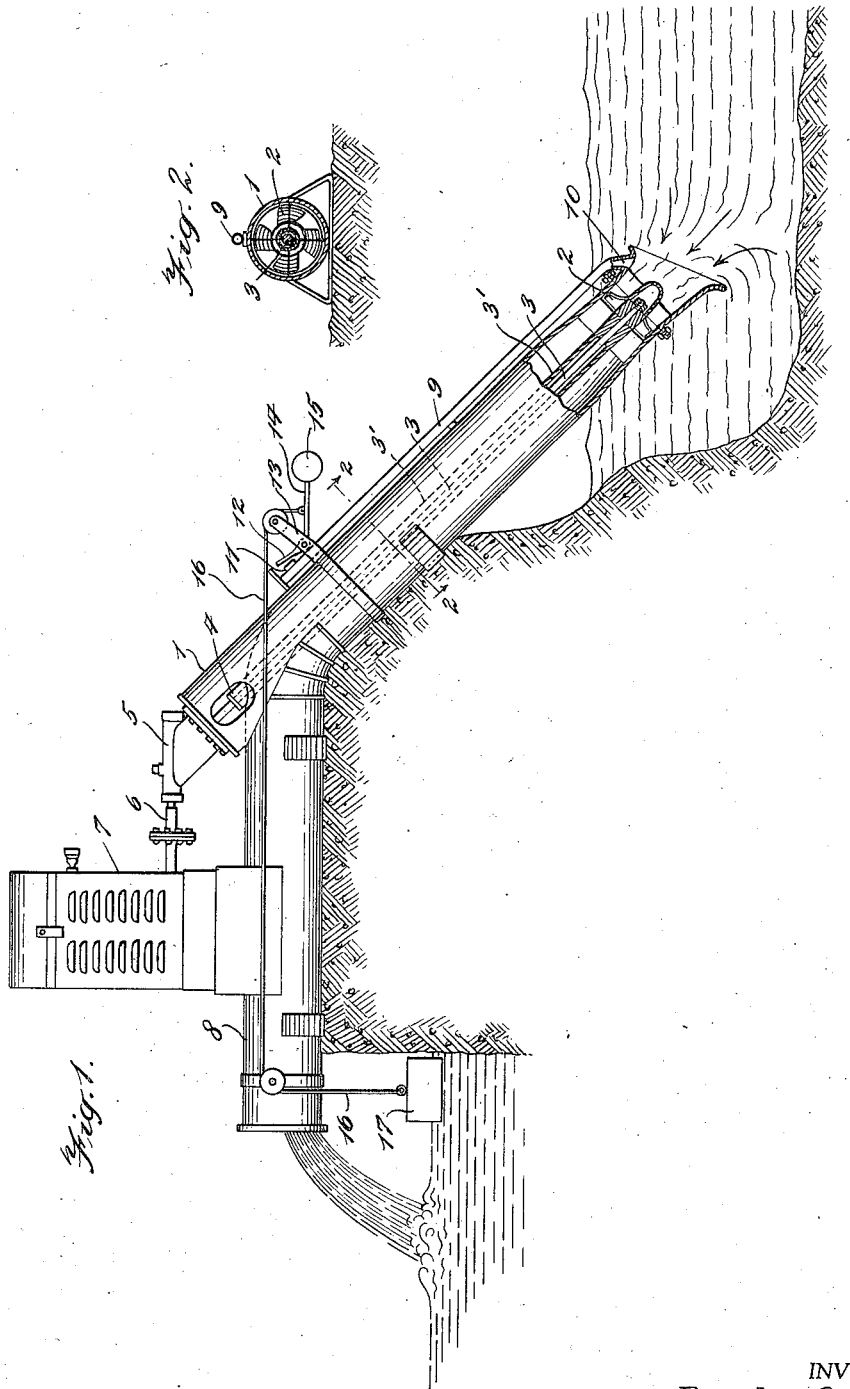
INVENTOR.
Royden O. Couch
BY Sheffield & Betts
HIS ATTORNEYS Patented June 23, 1936

2,045,442

UNITED STATES PATENT OFFICE 2,045,442

AERATING DEVICE

Royden O. Couch, Grant, Fla.

Application March 19, 1935, Serial No. 11,891

4 Claims. (Cl. 210—26)

The object of this invention is to provide a pump which may be installed either permanently or movably where surface water exists in comparatively quiet or stagnant form, so that such water may be aerated or mixed with air and its quality greatly improved for irrigating crops or for other purposes.

Another object of my invention is to provide a pump by which water may be raised from a source thereof to a higher point, such as a reservoir or distributing system where it is desired to maintain a constant level and still allow the pump to operate uninterruptedly particularly where the motive power is in constant operation and constant speed, to eliminate the presence of an attendant to control the operation of the power device or motor, in order to maintain the desired level in the reservoir of the distributing system.

The results above referred to are carried out by the apparatus about to be described, and which I at present deem preferable.

In the accompanying drawing, forming a part of the present specification, Fig. 1 is a side elevation of my improved aerating pump and a power device for operating the same, and Fig. 2 is a cross-section thereof taken substantially on the line 2—2 of Fig. 1.

In said drawing the numeral 1 indicates a suction or intake pipe through which water is drawn upward by a runner or impeller 2 carried on the lower end of a shaft 3 which passes through an enclosing tube 3' and stuffing box 4. The upper end of said shaft 3 enters a suitable housing 5 and is there provided with any preferred form of gearing by which it is connected with the horizontal shaft 6 running to the power device or motor 7. The power device may be electrically operated, as by a synchronous electric motor, directly connected with the shaft 3, or by an internal combustion engine, both devices being well known in the art. The upper end of the suction pipe 1 is connected with a horizontal discharge pipe 8 which may rest upon any suitable embankment or dam, as is illustrated. The left-hand end of the pipe 8 discharges into the reservoir or distributing system, as indicated in Fig. 1.

For aerating the water as it passes through the pipe 1, a tube 9 is provided and is carried by the pipe 1. Its lower end opens into the pipe 1 at a point 10 below the position of the impeller 2 to permit the ingress of air. Near the upper end of said pipe an opening is provided at 11, which opening is adapted to be closed more or less by a movable valve member 12, which is pivoted on a suitable support at 13. The valve member 12 is also provided with a counterbalance arm 14, which has a tendency to move downward on account of the weight 15 or other equivalent device carried thereby. The arm 14 is connected with a cord or rope 16 which passes over suitable pulleys and terminates in a float member 17, the position of which is determined by the height of the water in the reservoir.

From the above described construction, it will be appreciated that owing to the suction at the intake of the pipe 1, air will be drawn into said pipe from the tube 9 and will mix with the water being forced upward through said pipe. The water will thus be more or less aerated, according to the opening of the valve 12.

Thus, if the water in the main source of supply is more or less stagnant, it will be vitalized and aerated by the air mixed with the same when discharged into the reservoir, and will have its quality much improved.

In addition to the simple aeration of the water, the valve 12 also provides means for maintaining the level of the water in the reservoir. It will be seen that if the water in the reservoir is at a low level, the float 17 will be in a correspondingly low position. That would produce a downward movement of the valve cover 12 and close or partly close the opening in the upper end of the tube 9. Such being the case, less air is admitted to the intake of the pipe 1 and therefore more water is caused to pass therethrough, and the reservoir into which the water discharges will have its level raised quite rapidly. When the level of the water in the reservoir reaches the desired height, the float 17 will be raised to a corresponding height, and the counterbalance weight 15 therefor will be caused to drop. That motion will raise the valve cover 12 and allow more air to enter the intake pipe through the tube 9. There being more air mixed with the water under such conditions, less water will be delivered to the reservoir and the rise in the level thereof will cease or be greatly diminished.

Thus it will be appreciated that a regulation of the amount of flow through the pipes 1 and 8 is accomplished without in any way stopping or starting the motion of the source of power 7, or without changing its speed or action. This becomes of great advantage where the pumping units are located at comparatively remote points on a plantation or irrigating system and have no attendant constantly present.

It will therefore be seen that my improved pump produces two effects: One is to aerate the water for and improve its quality for irrigation purposes or other purposes for which it may be used. Secondly, the operation of the apparatus will automatically control the level of the water in the reservoir or distributing system without the presence of an attendant to watch and control the proper level of the water in the reservoir.

Having thus described this form of my invention, I do not wish to be understood as being limited to the details of the form or arrangement of parts set forth, for various changes may be made without departing from the spirit and scope of the invention as defined by the appended claims.

What I claim and desire to protect by Letters Patent, is:

1. An aerating device comprising, an intake pipe adapted to be inserted downwardly in a body of surface water, means for drawing liquid upwardly therethrough, and a conduit extending from a point above the surface of said water and having a connection at the lower end of said pipe below said means to permit the ingress of air into the latter.

2. An aerating pump comprising an upwardly-extending pipe adapted to have its lower end immersed in a liquid to be aerated, an impeller located within said pipe adjacent its lower end to force said liquid to flow upward in said pipe, a shaft on which said impeller is carried, means adjacent the upper end of said pipe for rotating said shaft and impeller, and a conduit connected with the lower end of said pipe below said impeller and extending above the surface of said liquid to allow suction to supply air to the same.

3. An aerating and pumping apparatus comprising, an upwardly-extending intake pipe adapted to have its lower end immersed in a body of surface water to be raised and aerated, an impeller located within said pipe, means for rotating said impeller, a conduit connected with the lower end of said pipe below said impeller and extending above the surface of said liquid, a valve on the upper end of said conduit and automatic means for controlling the amount of opening of said valve.

4. An aerating and pumping apparatus comprising, an upwardly-extending intake pipe adapted to have its lower end immersed in a liquid to be raised and aerated, an impeller located within said pipe, means for rotating said impeller, a conduit connected with the lower end of said pipe and extending above the surface of said liquid, a valve on the upper end of said conduit, a float member adapted to rest on the surface of the water when discharged, and connections between said float member and said valve to determine the amount of opening of the latter.

ROYDEN O. COUCH.